United States Patent
Leng

(10) Patent No.: US 9,917,667 B2
(45) Date of Patent: Mar. 13, 2018

(54) HOST-TO-HOST TEST SCHEME FOR PERIODIC PARAMETERS TRANSMISSION IN SYNCHRONIZED TTP SYSTEMS

(71) Applicant: Hamilton Sundstrand Corporation, Charlotte, NC (US)

(72) Inventor: Qiuming Leng, South Barrington, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 92 days.

(21) Appl. No.: 14/977,382

(22) Filed: Dec. 21, 2015

(65) Prior Publication Data

US 2017/0180069 A1 Jun. 22, 2017

(51) Int. Cl.
| | |
|---|---|
| H04L 12/26 | (2006.01) |
| H04J 3/06 | (2006.01) |
| H04B 7/26 | (2006.01) |
| H04J 3/14 | (2006.01) |
| H04W 56/00 | (2009.01) |

(52) U.S. Cl.
CPC .......... *H04J 3/0647* (2013.01); *H04B 7/2643* (2013.01); *H04J 3/14* (2013.01); *H04W 56/001* (2013.01)

(58) Field of Classification Search
None
See application file for complete search history.

(56) References Cited

U.S. PATENT DOCUMENTS

| | | |
|---|---|---|
| 6,775,804 B1 | 8/2004 | Dawson |
| 7,548,551 B2 | 6/2009 | Kanajan |
| 7,787,488 B2 | 8/2010 | Jiang |
| 7,949,811 B2 | 5/2011 | Fuehrer et al. |
| 2004/0081079 A1* | 4/2004 | Forest .................. H04L 12/417 370/216 |
| 2009/0125592 A1* | 5/2009 | Hartwich ............... H04L 49/90 709/206 |
| 2013/0294255 A1 | 11/2013 | Olgaard et al. |

FOREIGN PATENT DOCUMENTS

EP 2528283 A1 11/2012

OTHER PUBLICATIONS

Extended European Search Report received from the European Patent Office dated Apr. 21, 2017 for Application No. EP 16204853.

* cited by examiner

*Primary Examiner* — Anh-Vu Ly

(74) *Attorney, Agent, or Firm* — Locke Lord LLP; Scott D. Wofsy; Alexander Viderman

(57) ABSTRACT

A system for testing synchronous TTP communication networks is provided. The system includes a first and second nodes coupled to a transmission bus. The first node is configured to generate a test command, which includes a test flag and a test round field, set the test flag, and transmit the test command and a plurality of parameters via the transmission bus using data frames. The second node is configured to receive the test command and the plurality of parameters from the transmission bus, determine whether the test flag is set, and compare parameter values in the received data frames with expected values in a test vector stored on the second node, for each of the plurality of parameters, in response to determining that the test flag is set. The first and second nodes are configured to communicate with each other using a TTP on a time slot basis.

20 Claims, 9 Drawing Sheets

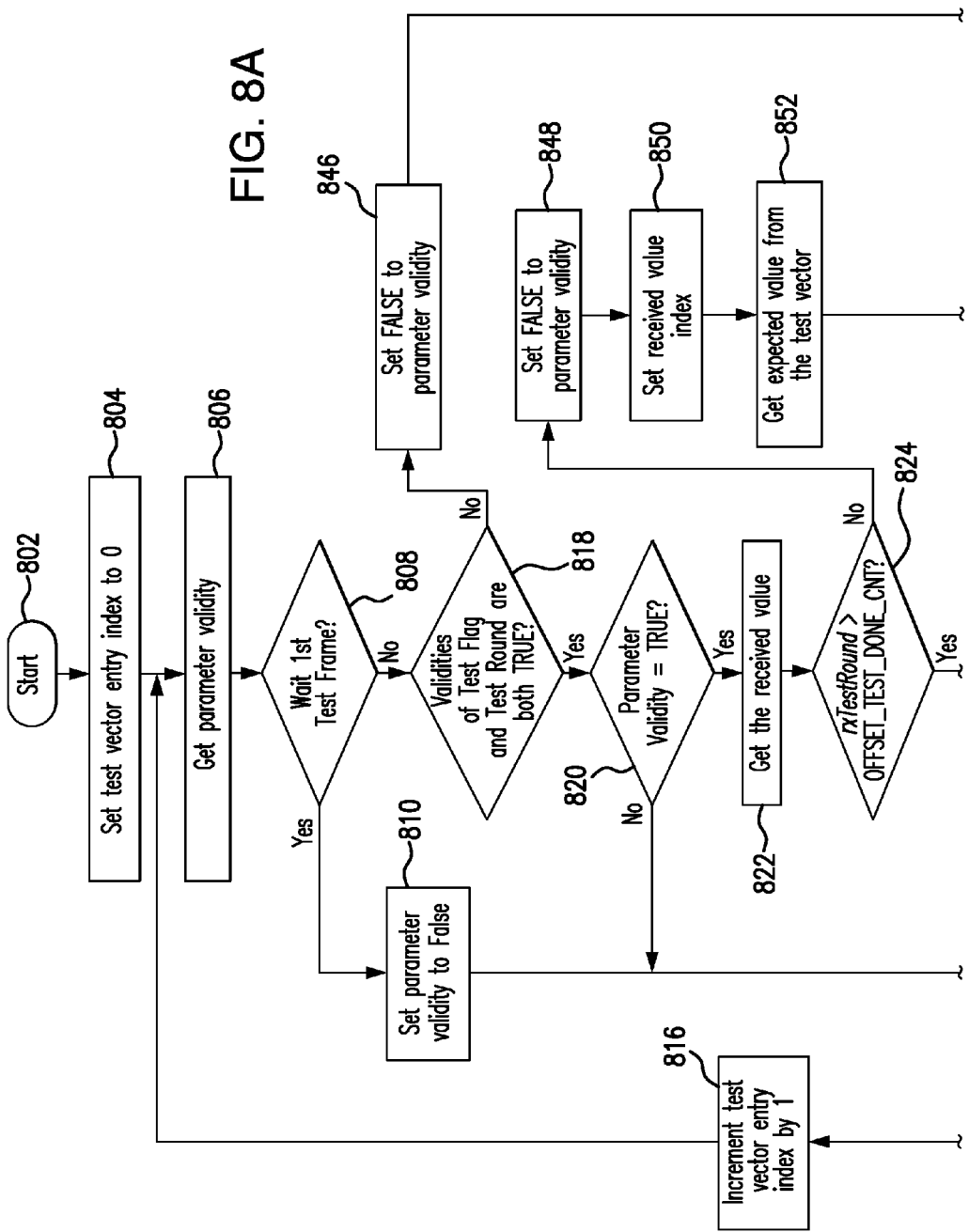

HOST-TO-HOST TEST SCHEME FOR PERIODIC PARAMETERS TRANSMISSION IN SYNCHRONIZED TTP SYSTEMS

FIELD OF THE INVENTION

The present invention relates to functional testing of complex systems, and more particularly, to a host-to-host test scheme for periodic parameters transmission in synchronous Time-Triggered Protocol (TTP) systems.

BACKGROUND OF THE INVENTION

TTP enables a group of nodes to communicate using a time division multiple access (TDMA) scheme where the nodes employ a distributed clock synchronization algorithm to synchronize their local clocks to one another. Fault-tolerance or graceful degradation is the property that enables a computer based system to continue operating properly in the event of the failure of some of its components. As the need for safety critical systems has expanded into embedded applications in automotive, aerospace, industrial, medical, etc. systems, TTP has been widely used in a variety of such embedded applications, primarily due to its deterministic property and high fault tolerance. Given the need for safety in critical systems, the ability to efficiently and reliably test periodic parameters in such systems is highly advantageous.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system for testing distributed synchronous TTP communication networks is provided. The system includes a first node and a second node coupled to a transmission bus. The first node is configured and operable to generate a test command, which includes a test flag and a test round fields, and initiate a test by setting the test flag in the test command. The first node is also configured and operable to transmit the test command along with a plurality of parameters to be tested via the transmission bus. The second node is configured and operable to receive the test command along with the plurality of parameters to be tested from the transmission bus. The second node is further configured and operable to compare parameter values from the received data frames with expected values in a test vector table stored on the second node, for each of the plurality of parameters, in response to determining that the test flag is set. The first and second nodes are configured to communicate with each other using a time-triggered protocol (TTP) on a time slot basis.

In another aspect a method for testing distributed synchronous TTP communication networks is provided. The method includes generating, by a first node, a test command comprising a test flag and a test round field; initiating, by the first node, a test by setting the test flag in the test command; and transmitting, by the first node, the test command and a plurality of parameters to be tested via a transmission bus using data frames. The method further includes receiving, by a second node, the test command and the plurality of the parameters to be tested from the transmission bus; determining, by the second node, whether the test flag in the received test command is set; and comparing, by the second node, parameter values in the received data frames with corresponding expected values in a test vector stored on the second node, for each of the plurality of parameters, in response to determining that the test flag is set.

BRIEF DESCRIPTION OF THE DRAWINGS

So that those having ordinary skill in the art, to which the present invention pertains, will more readily understand how to employ the novel system and methods of the present certain illustrated embodiments, the embodiments thereof will be described in detail herein-below with reference to the drawings, wherein:

FIGS. 8A and 8B are a flowchart illustrating an exemplary received parameters verification procedure, in accordance with an illustrated embodiment of the present invention.

DETAILED DESCRIPTION OF CERTAIN EMBODIMENTS

The below described embodiments are directed to a scheme for testing periodic parameters transmission in synchronous TTP systems, such as, but not limited to, aerospace systems. It is to be appreciated that the below described embodiments are not limited in any way to what is shown in the Figures, and instead, can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the certain illustrated embodiments. Furthermore, the terms and phrases used herein are not intended to be limiting but rather to provide an understandable description of the certain illustrated embodiments.

Unless defined otherwise, all technical and scientific terms used herein have the same meaning as commonly understood by one of ordinary skill in the art to relating to below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a," "an," and "the" include plural referents unless the context clearly dictates otherwise. Thus, for example, reference to "a stimulus" includes a plurality of such stimuli (and equivalents known to those skilled in the art) and reference to "the signal" includes reference to one or more signals (and equivalents thereof known to those skilled in the art), and so forth.

It is to be appreciated the certain embodiments described herein are preferably utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed in a processor of a host computer, regardless of whether the implementation is in hardware, firmware or as a software computer product available on a disc, a memory storage device, for download from a remote machine, etc.

The term "test vector" is used herein to identify one or more input vectors and their corresponding output vectors that are used to verify transmission of periodic parameters in a distributed synchronous TTP communication network environment.

Figure 1:
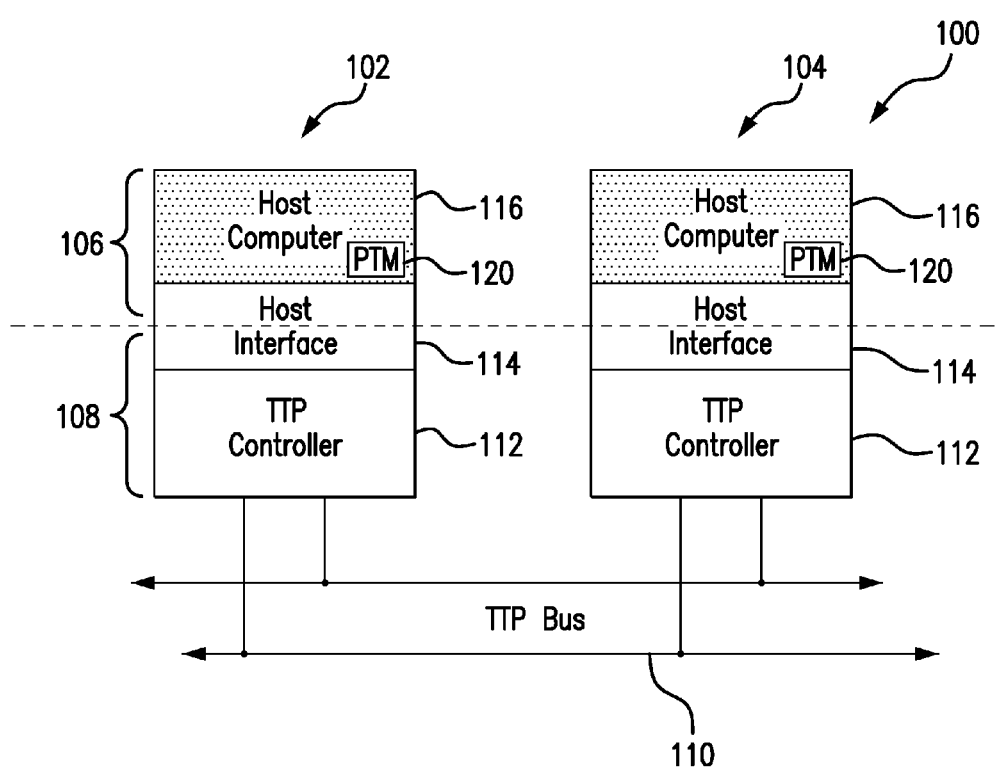
FIG. 1 is an exemplary diagram of a distributed TTP communication network environment in accordance with a possible embodiment of the present invention.

The TTP is a real-time communication protocol for the interconnection of electronic modules of distributed fault-tolerant real-time systems. TTP's features support the design of systems with a high degree of dependability, safety, availability, reliability, maintainability, and reduced system complexity. Referring now to FIG. 1, there is illustrated an exemplary diagram of a distributed TTP-based communication network environment in accordance with a possible embodiment of the present invention. In one embodiment, a TTP-based communication network (referred to hereinafter as "TTP network") 100 comprises a set of nodes 102, 104 typically interconnected by a TTP bus 110. A node is labeled as a sending node 102 when it originates a frame to be sent over the TTP network 100. A node is labeled as a receiving node 104 when it is a consumer of some data from a frame received over the TTP network 100. The same physical node may thus be labeled either the sending node or the receiving node depending upon the source and destination corresponding to a set of parameters to be tested. While only two nodes are shown in FIG. 1, more nodes may be added to the TTP network 100. Depending on the system architecture and the system requirements, e.g. with respect to fault tolerance, the TTP bus 110 may have multiple channels and in various embodiments communication between the nodes 102, 104 can be established on a single channel or redundant channels basis. Each communication node 102, 104 comprises two layers, namely, a communication layer 108 and a host layer 106. The communication layer 108 implements TTP protocol services. The host layer 106 supplies/consumes data to/from the communication layer 108. The two layers can run synchronously or asynchronously. In various embodiments of the present invention, however, the disclosed test scheme only applies to the synchronous TTP node/system, which requires the two layers 106, 108 to run synchronously to make the data flow deterministic and jitter free from the host 116 at the sending node 102 to the host 116 at the receiving node 104.

Still referring to FIG. 1, each exemplary node 102, 104 further comprises a host 116, a host interface 114 and a communication controller 112. The host 116 is generally the part of an electronic control unit where the application software is executed. In one embodiment, the host 116 comprises a CPU executing an operating system which manages the application software, with memory and the access to the I/O subsystem, or a field programmable gate array (FPGA). The communication controller 112 facilitates the execution of the protocol services based on a statically defined set of communication requirements. In other words, the communication controller 112 is responsible for transmission and reception of data. The host interface 114 facilitates data exchange between the host layer 106 and the communication layer 108. The host interface 114 supervises interoperability between the host 116 and the communication controller 112 for frame, status and control data.

According to a TTP protocol, the communication controller 112 provides a time base to trigger the protocol events (the execution of the TTP services, frame reception and frame transmission). The global time base ensures seamless protocol execution and cluster operation between all nodes 102, 104 within a configurable time interval.

Figure 2:
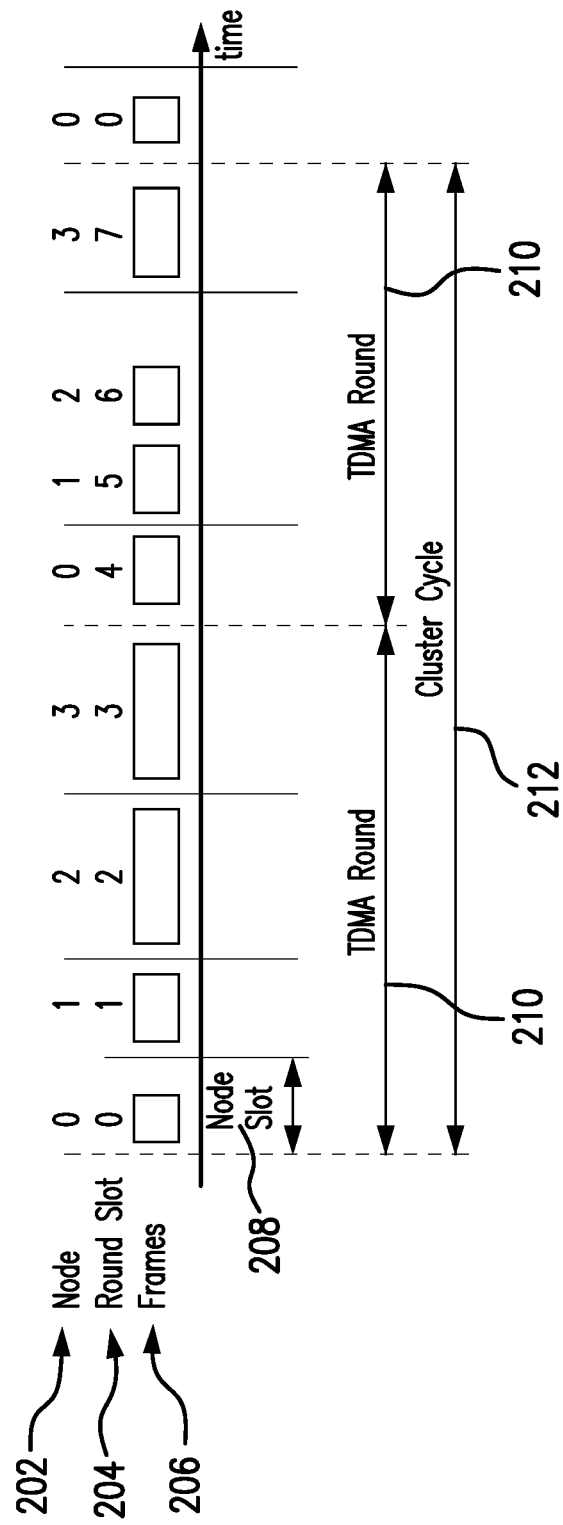
FIG. 2 illustrates an embodiment of time division multiple access (TDMA) based TTP operation, as may be effectuated at a communication layer, within various nodes connected to the communication network of FIG. 1.

FIG. 2 illustrates an embodiment of time division multiple access (TDMA) based TTP operation scheme, as may be effectuated at a communication layer, within various nodes connected to the communication network of FIG. 1. According to this TDMA based TTP protocol, every node (such as nodes 102 and 104 shown in FIG. 1) has a certain amount of reserved bandwidth, referred to hereinafter as a node slot 208, to write data to the TTP bus 110. Notably, every communication controller 112 receives all data frames available on the TTP bus 110 from other nodes.

Furthermore, the nodes 102, 104 periodically utilize the TTP bus 110 in its dedicated node slot 208, by sending frames 206 on one or more channels of the TTP bus 110. A TDMA round 210 comprises a periodic sequence of node slots 202. The duration of each slot 208 as well as the sending sequence 202 of the different nodes is fixed in all TDMA rounds 210. A cluster cycle 212 is the pattern of periodically recurring TDMA rounds 210.

Figure 3:
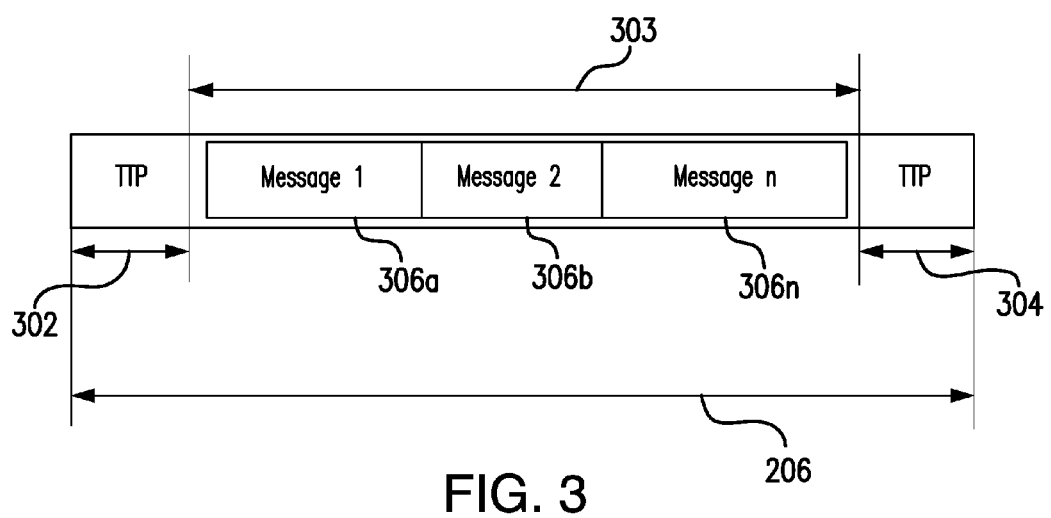
FIG. 3 illustrates an exemplary TTP frame layout.

Referring now to FIG. 3, there is illustrated an exemplary TTP frame layout. As discussed above, a TTP frame 206 is a structure used by the TTP-based communication network 100 to exchange information within the system. An exemplary frame 206 may comprise a header segment 302, a frame body 303, and a trailer segment 304. The frame body 303 is the primary part of the TTP frame 206 and usually carries application data produced or consumed by the host layer 106. As shown in FIG. 3, the frame body 303 may be subdivided into parts called messages 306a-306n. Referring back to FIG. 1, when a frame 206 is received by the receiving node 104, the communication controller 112 of the receiving node 104 passes the frame body extracted from the received frame 206 to the host 116 through the host interface 114 of the receiving node 104. On the other hand, at a frame 206 transmission, the communication controller 112 of the sending node 102 fetches the frame body from the host interface 114 of the sending node 102, adds the frame header 302 and trailer 304 and puts the frame 206 on the TTP Bus 110.

The header segment 302 and trailer segment 304 are necessary for the operation of TTP protocol. In one embodiment, the header segment 302 contains information about the frame 206, such as, but not limited to, frame type. For maintaining data integrity the CRC technique is used for detecting errors in data transmitted over the TTP network 100. The CRC value is calculated and inserted into the trailer segment 304 at the sending node 102. CRC value checking is performed when a frame 206 is received at the receiving node 104. In various embodiments, the check may be performed on both the header segment 302 and frame body 303 portions.

To summarize the TTP protocol communication scheme at a high level, when the communication controller 112 in the receiving node 104 receives a frame 206 from the TTP bus 110, it checks the frame integrity using the CRC technique. If the CRC integrity check passes, the communication controller 112 of the receiving node 104 passes the frame body 303 to the host computer 116 of the receiving node 104. If the integrity check fails, the communication controller 112 drops the frame 206. The host 116 of the receiving node 104 unpacks the frame body 303 and makes the received parameters available to consumers in the application. For transmission, the host 116 of the sending node 102 packs the outgoing parameters into the TTP frame body 303 and passes the frame body 303 to the communication controller 112 of the sending node 102. The communication controller 112 of the sending node 102 adds the header segment 302 and the trailer segment 304 containing integrity check CRC to form a TTP frame 206. Once the frame 206 is formed, the communication controller transmits the frame 206 on the TTP bus 110. As noted above, the same physical node may thus be labeled either the sending node or the receiving node depending upon the source and destination of a set of parameters to test. It should be further noted that at each TDMA round 210, each node only transmits one TTP frame 206 but can receive multiple frames, each from one of the other nodes connected to the TTP bus 110.

Those skilled in the art will know that transmission of periodic parameters and verification of transmitted periodic parameters is common in many critical systems, such as aerospace systems. Typically, to verify the parameter transmission periods in a TTP system, testers heavily rely on reviewing or simulate-testing TTP message scheduler and counting the parameter scheduling times in a TTP cluster. However, this approach is not fully reliable because it focuses on message scheduler component of the host 116 at the sending node 102, without verifying whether the scheduled for transmission TTP frames 206 are actually transmitted by the communication controller 112 and whether the frames scheduled for transmission are actually all received by the communication controller 112 at the receiving node 104, let alone verifying the values communicated by the transmitted frames. Since assurance of periodic parameters is critical in many distributed real-time deterministic communication systems, a reliable and efficient testing scheme to verify proper transmission of periodic parameters is desirable.

Embodiments of the present invention help to overcome these and other disadvantages by providing techniques and schemes that may be used in the host-to-host testing of synchronous TTP systems and the like. As will be appreciated by one skilled in the art, aspects of the present invention may be embodied as a method or computer program product. The different illustrative embodiments may be implemented as a distributed software test engine module, referred to hereinafter as Parameter Testing Module (PTM) 120 implemented on the host 116 of each node 102, 104 as shown in FIG. 1. The PTM 120 may be invoked, for example, during system integration and verification testing.

FIGS. 4-7, 8A and 8B are flowcharts illustrating a method for testing distributed synchronous TTP communication networks, in accordance with an illustrated embodiment of the present invention. Before turning to description of FIGS. 4-7, 8A and 8B, it is noted that the flow diagrams in these figures show examples in which operational steps are carried out in a particular order, as indicated by the lines connecting the blocks, but the various steps shown in these diagrams may be performed in other order, or in other combination or sub-combination. It should be appreciated that in some embodiments some of the steps described below may be combined into a single step. In some embodiments, one or more additional steps may be performed.

Figure 4:
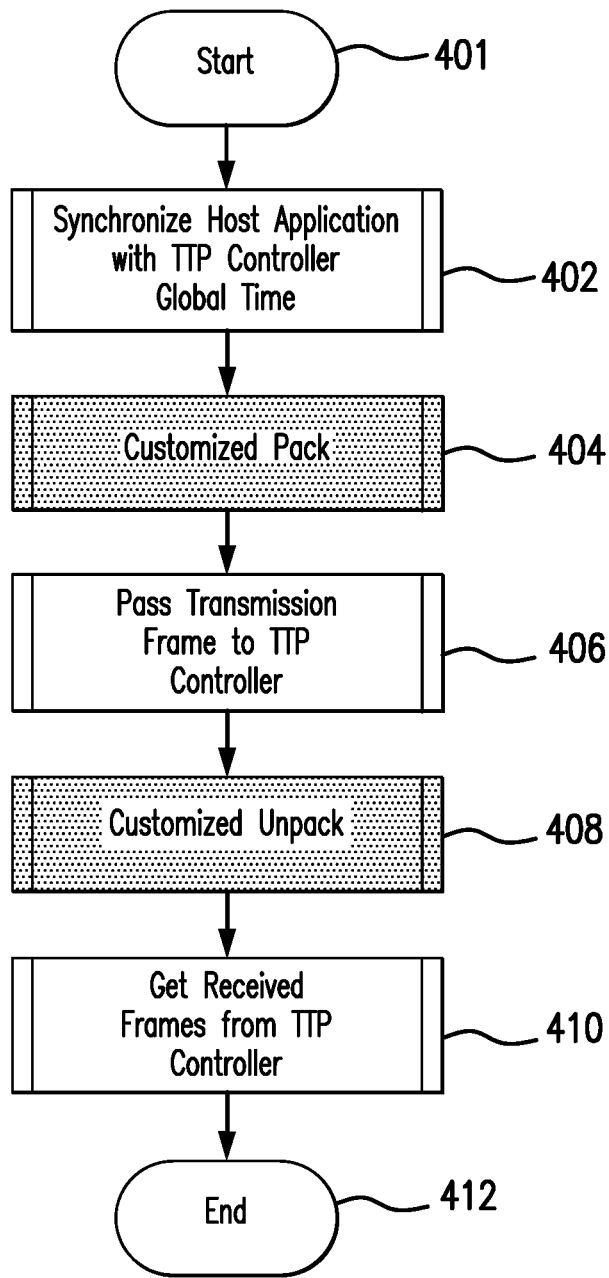
FIG. 4 is a flowchart illustrating a set of high level procedures relevant to embodiments of the present invention, as may be effectuated at a host layer, in accordance with an illustrated embodiment of the present invention.

Starting with FIG. 4, there is illustrated a high level overview of a set of procedures relevant to the disclosed test scheme, as may be effectuated at a host layer, in accordance with an illustrated embodiment of the present invention. The procedure starts at step 401. As noted above, the communication controller 112 provides a time base to trigger the protocol events. This time base typically has a granularity in macro tick units. Step 402 synchronizes the host 116 with the communication controller 112 to a common global TTP time base. In one embodiment, this synchronization is necessary so that the flow of TTP frames 206 can be deterministic and jitter free from the pack procedure of a frame formation in communication task running on the host 116 at the sending node 102 to the unpack procedure of extracting data from a frame in communication task running on the host 116 at the receiving node 104. Notably, step 402 is not a part of the disclosed testing scheme but rather is an essential mechanism for making a TTP node a synchronous node and a TTP network a synchronous host-to-host communication network.

According to an embodiment of the present invention, at step 404, the PTM 120 may invoke a customized version of a software pack function. In one embodiment, the customized pack function is named, for example, Test_Pack( ). The test function Test_Pack( ) invoked in step 404 by the PTM 120 running on the sending node 102 in turn invokes the conventional function pack( ) to pack the parameters into the TTP frame 206 for transmission. According to an embodiment of the present invention, both the Test_Pack ( ) and described below Test_Unpack( ) functions are configured to operate in at least two modes, the test mode and the normal mode. When the test mode is active, the test function Test_Pack( ) is configured to set the parameters to be transmitted with their corresponding test values and call the conventional pack( ) function. When the PTM 120 operates in normal mode, the test is not active and the test function Test_Pack( ) falls back to the conventional software function pack( ) as described below in greater detail with respect to FIG. 5.

Notably, various embodiments of the present invention utilize a test command data structure that is transmitted from the sending node 102 to the receiving node 104 in every TDMA round 210. In one embodiment, the test command comprises two fields—testFlag, indicating the current status of a test, and testRound, which comprises a counter incremented by one for every TDMA round 210, when the PTM 120 operates in a test mode. The test command transmitted during each TDMA round 210 enables the PTM 120 to communicate the test state and keeps the testing in synch between the sending node 102 and receiving node 104. For example, the testRound counter enables the sending node 102 to derive the test values for the parameters to be tested in the current testing round, while the same testRound counter received at the receiving node 104 helps the receiving node 104 to determine the expected values of the received parameters.

According to an embodiment of the present invention, the PTM 120 running on the sending node 102 uses the testFlag field to trigger a test. In some embodiments, the testFlag may be a Boolean flag which takes a value of either true (1) or false (0). When a testFlag is set true, it may indicate that the corresponding test is active. Similarly, when the testFlag is set false, it may indicate that the corresponding test is not active. It is contemplated that the testFlag may also be any other types of flags, such as integer flags, for example.

In some embodiments, the testRound has a 32-bit format and can take values from 0 to ffffffff (hex). When the PTM 120 operates in a test mode, this field keeps incrementing by one for every TDMA round 210. As part of the test command, this field is also received by the receiving node 104 in every TDMA round 210 and comprises an image of the testRound on the sending node 102. For ease of description, the testFlag and the testRound fields on the receiving node 104 will be referred hereinafter as rxTestFlag and rxTestRound, respectively.

During system initialization at the sending node 102, the testFlag is initialized to false and the testRound, is initialized to 0. In some embodiments, the test flag may be a user-configurable parameter, thus enabling the user to initiate and stop the test manually. In other embodiments, the test flag may be set/reset by the PTM 120 and/or any other auto testing software module. Notably, during system initialization rxTestFlag and rxTestRound are also initialized to 0 at the receiving node.

Figure 5:
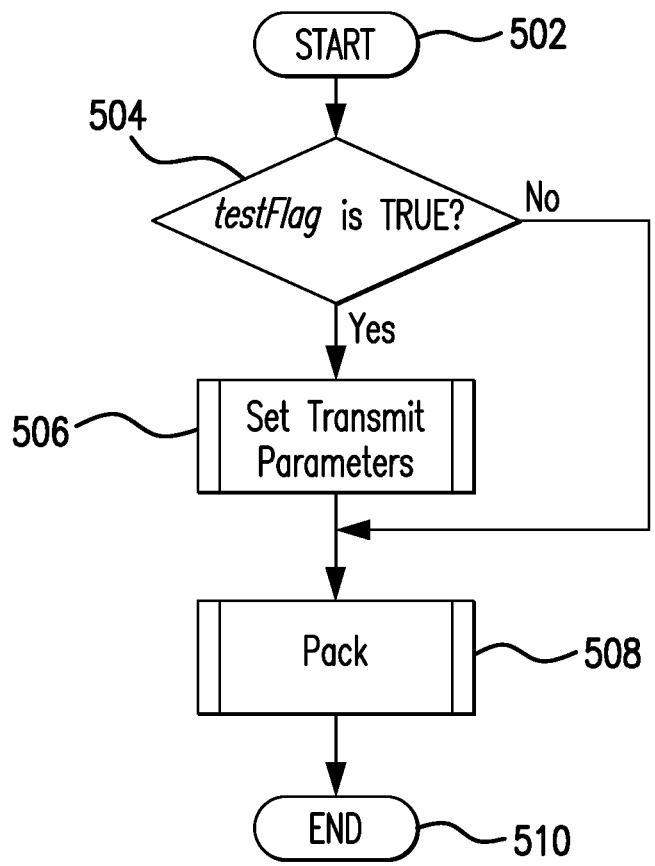
FIG. 5 is a flowchart illustrating an exemplary customized pack procedure, in accordance with an illustrated embodiment of the present invention.

Referring now to FIG. 5, there is illustrated an exemplary customized pack procedure that may be utilized for testing distributed synchronous TTP communication networks, in accordance with an illustrated embodiment of the present invention. The procedure starts at step 502. At step 504, the PTM 120 determines whether the test mode has been activated by checking the user-configurable test flag testFlag.

In response to determining that the test mode is active (decision block 504, "yes" branch), at step 506, the PTM 120 invokes a test function, named Set_Transmit_Parameters( ) for example, to set the parameters under test with the values derived from their corresponding entries in a test vector, as described below in greater detail with respect to FIG. 7. According to an embodiment of the present invention, after setting the parameters or in response to determining that the test flag is set to false (decision block 504, "no" branch), at step 508, the PTM 120 packages at least some of the parameters along with the test command into a TTP frame 206 by invoking the conventional Pack( ) function, depending on the parameters scheduled activities at the current round. The procedure ends at step 510.

Referring back to FIG. 4, at step 406, once the parameters to be tested are inserted in the TTP frame 206, the PTM 120 transfers the frame body 306a-306n via the host interface 114 to the communication controller 112 running on the sending node 102. The communication controller 112 transmits the frame 206 on the TTP bus 110.

According to an embodiment of the present invention, at step 408, the PTM 120 may invoke a customized version of a software unpack function. In one embodiment, the customized unpack function is named, for example, Test_Unpack( ). The test function Test_Unpack( ) invoked in step 408 by the PTM 120 running on the receiving node 104 in turn invokes the conventional function Unpack( ) to unpack the received frame 206. As noted above, the Test_Unpack( ) function is also configured to operate in at least two different modes. When the test mode is active, the test function Test_Unpack( ) is configured to verify that values of the parameters received at the receiving node 104 are equal to the expected values derived from the test vector on the receiving node 104. When the PTM 120 operates in normal mode, the test is not active and the test function Test_Unpack( ) falls back to the conventional software function Unpack( ) as described below in greater detail with respect to FIG. 6.

Figure 6:
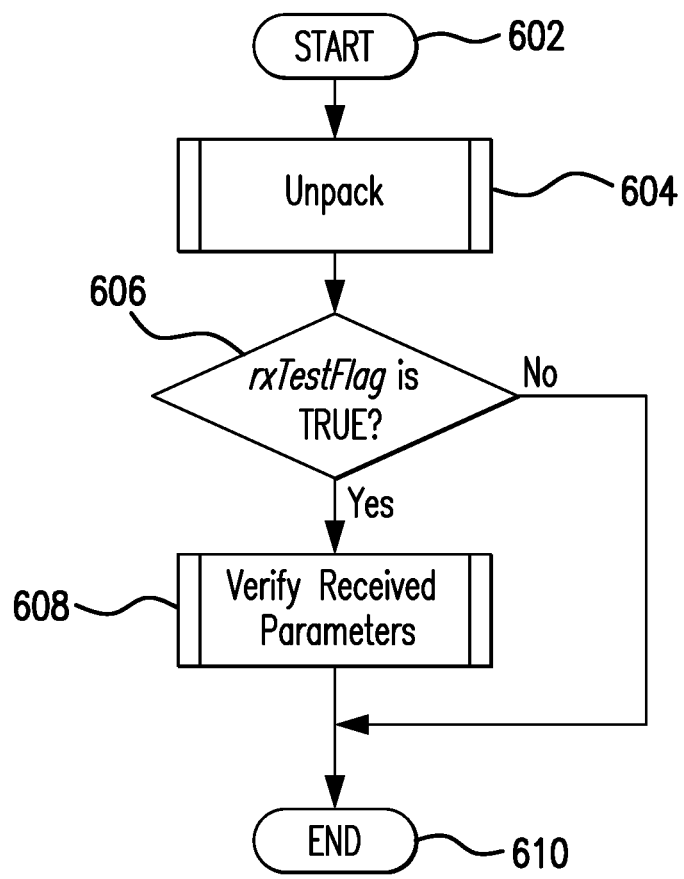
FIG. 6 is a flowchart illustrating an exemplary customized unpack procedure, in accordance with an illustrated embodiment of the present invention.

Referring next to FIG. 6, there is illustrated an exemplary customized unpack procedure that may be utilized for testing distributed synchronous TTP communication networks, in accordance with an illustrated embodiment of the present invention. The procedure starts at step 602. At step 604, the PTM 120 unpacks the received parameters including the test command from the received frame body 306a-306n by invoking the conventional Unpack( ) function. Next, at step 606, the PTM 120 determines whether the test mode has been activated by checking the user-configurable test flag, rxTestFlag, in the received test command structure.

In response to determining that the test mode is active (decision block 606, "yes" branch), at step 608, the PTM 120 invokes a test function named Verify_Received_Parameters( ) for example, to compare the received parameters with the expected values derived from their corresponding entries in the test vector, as described below in greater detail with respect to FIGS. 8A and 8B. According to an embodiment of the present invention, after verifying the received parameters or in response to determining that the test flag is set to false (decision block 606, no branch), at step 610, the procedure ends.

At the receiving node 104, the communication controller 112 picks up the TTP frame 206 from the TTP bus 110 and passes the frame body 306a-306n to the host 116 via the host interface 114, step 410. In various embodiments, steps 406 and 410 may be performed via Direct Memory Access (DMA) and/or interrupts. Notably, steps 406 and 410 are not part of the disclosed test scheme. However, the correct timing between steps 404 and 406, and correct timing between steps 408 and 410 are essential to form deterministic and jitter free TTP communication from the host 116 at the sending node 102 to the host 116 at the receiving node 104. The host 116 needs to complete the packaging of parameters into a TTP frame 206 (step 404) and pass the frame 206 to the communication controller 112 before the controller 112 starts to transmit. Otherwise, the newly packaged frame would not get transmitted at the current TDMA round 210. The newly received TTP frames 206 at the receiving node 104 from the previous TDMA round 210 have to be available before the unpack procedure starts (step 408). Otherwise, the test parameters may have stale data resulting in a failed test. The procedure ends at step 412.

Embodiments of the present invention provide a test vector for use with the TTP network 100 under test. In one embodiment, a test vector comprises a table used as a test input by a sending 102 or a receiving 104 node. It should be understood that the sending node 102 and receiving node 104 are paired. The test vector on the sending node 102 and test vector on the receiving node 104 are also paired. They may not be used interchangeably. The pair of test vectors is dedicated to test a set of parameters (specified in the pair of test vectors).

Each entry in a test vector table represents a test input dedicated for testing a specific parameter transmitted from the sending node 102, or received by the receiving node 104. In an embodiment of the invention, the PTM 120 utilizes the same test vector data structure type at both the sending 102 and receiving 104 nodes. An exemplary test vector data structure type implemented in "C" programming language is illustrated below, and may be used by the PTM 120 to test transmission of the periodic parameters:

```
typedef struct
{
  U16 paramID;
  void *ptrOutParam;
  void *ptrInParam;
  U8 * ptrInParamValidity;
  U8 numOfBytes;
  U8 numOfBits;
  U16 period;
  U32 txValue[4];
  U32 expRxValue[4];
  TEST_TX_RND_OFFSET *ptrTestTxRndOffset;
} TEST_VECT_STRUCT;
```

Here, the paramID is a unique number to identify a parameter to be tested and ptrOutParam, ptrInParam and ptrInParamValidity represent pointers to the: parameter on the sending node 102, received parameter and received parameter validity on the receiving node 104 (in embodiments of the present invention, ptrOutParam and ptrInParam may need to be type cast to the type of test parameter based on field numOfBytes, when used). In addition, the test vector data structure includes: the numOfBytes field representing the parameter size in bytes on the host 116, the numOfBits field representing a number of bits transmitted on the TTP bus 110 for the parameter and period representing a parameter transmission period in units of TDMA round 210. The txValue field of the test vector data structure represents an array of test values used to set the parameter transmitted by the sending node 102. In one exemplary embodiment, the array may comprise four values. The field expRxValue represents an array of expected values used by the PTM 120 on the receiving node 104 for the comparison with the corresponding transmission parameter. The ptrTestTxRnd-Ofset is used to capture the transmission round offset described below.

According to an embodiment of the present invention, some of the plurality of parameters are associated with a multi-frame inter-transmission period. Thus, a new test value set to such a parameter may or may not get transmitted on the TTP bus 110 right away (at the current TDMA round 210), depending on the parameter transmission period and the offset from the current TDMA round to the parameter's next transmission round. For instance, a new test value set to a parameter whose transmission period is equal to a TDMA round 210 gets transmitted on the TTP bus 110 by the sending node 102 right away (at the current TDMA round 210, because every TDMA round is its transmission round). As another non-limiting example, a parameter whose transmission period is 4 (four) TDMA rounds 210 gets transmitted on the sending node 102 once every four TDMA rounds 210. In other words, when a parameter is associated with a transmission period equal to four TDMA rounds and when a new test value for such parameter is set, the test value gets transmitted on the TTP bus 110 at the current TDMA round 210 if the current TDMA round is its transmission round, or at the next TDMA round 210 if the next TDMA round is its transmission round, etc. According to an embodiment of the present invention, since the test can start (be triggered) any time after the sending node 102 and the receiving node 104 are up and running, the first transmission round for a parameter with four TDMA round 210 transmission period can be 0, 1, 2, or 3 TDMA rounds 210 away from start of the test, and so the parameter transmission offset can be 0, 1, 2 or 3 depending on the timing of start of the test. Accordingly, embodiments of the present invention provide a transmission round offset (referred to hereinafter as offset) indicating the difference (offset) in TDMA round units from a test round in which a new test value is set to the test round in which the newly set test value gets transmitted. An exemplary round offset data structure is illustrated below, and may be used by the PTM 120 to test transmission periods of the periodic parameters:

```
typedef struct
{
  SS_U16 offset;
  SS_BOOL found;
} TEST_TX_ROUND_OFFSET;
```

Here, the offset field is a number representing an offset in TDMA round units from a test round in which a new test value is set to the test round in which the parameter with the test value gets transmitted and the found field is a Boolean flag indicating whether or not the offset was found by the PTM 120 on the receiving node 104.

In order to facilitate a greater understanding of various embodiments of the invention, the following examples of test vector tables implemented in "C" programming language are set forth for illustration purposes only and are not to be construed as limits on the embodiments of the present invention. The test vector table on sending node 102 may look like the following:

```
const TEST_VECT_STRUCT txTestVect[ ] =
{
    {1, &txParam1, PNULL, PNULL, 1, 2, 4,
        {0xff, 0x00, 0xa5, 0x5a}, /* test value array used on tx node */
        {0x03, 0x00, 0x01, 0x02}, /* not used on tx node, just for easy
        reference */
        PNULL},
    {2, &txParam2, PNULL, PNULL, 2, 9, 2,
        {0xffff, 0x0000, 0xa5a5, 0x5a5a}, /* test value array used on tx
        node */
        {0x01ff, 0x0000, 0x01a5, 0x005a}, /* not used on tx node, for
easy reference */
        PNULL},
    ......
};
```

According to the vector table above, for test parameter 1 of unsigned char data type, 2 bits are transmitted on the TTP bus 110 and the transmission period for the test parameter 1 is equal to 4 TDMA rounds. Similarly, for test parameter 2 of unsigned short data type, 9 bits are transmitted on the TTP bus 110 and the transmission period for this parameter is 2 TDMA rounds.

The corresponding test vector table on the receiving node 104 may look like the following:

```
const TEST_VECT_STRUCT rxTestVect [ ] =
{
    {1, PNULL, &rxParam1, &rxParam1Validity, 1, 2, 4,
        {0xff, 0x00, 0xa5, 0x5a}, /* not used on rx node, just for easy
        reference */
        {0x03, 0x00, 0x01, 0x02}, /* expected value array on rx node */
        &rxParam1Offset},
    {2, PNULL, &rxParam2, &rxParam2Validity, 2, 9, 2,
        {0xffff, 0x0000, 0xa5a5, 0x5a5a}, /* not used on rx node, just
for easy reference */
        {0x01ff, 0x0000, 0x01a5, 0x005a}, /* expected value array on
        rx node */
        &rxParam2Offset},
    ......
};
```

Furthermore, in one embodiment of the present invention, the PTM 120 utilizes the test values stored in the txValue array of the test vector data structure in conjunction with associated transmission periods in such a way that the test value cyclic pattern occurs. Notably, each test value is set to a parameter for period TDMA rounds in the order the test values are arranged in the txValue[ ] array. For example, if a parameter is associated with the txValue[ ] array of size four and having test values of {0xff, 0x00, 0xa5, 0x5a} and associated with a transmission period of 2 (two) TDMA rounds 210, the PTM 120 at the sending node 102 sets the test value 0xff for two TDMA rounds 210, followed by the test value 0x00 for next two TDMA rounds 210, followed by the test value 0xa5 for next two TDMA rounds 210 and followed by the test value 0x5a for another two TDMA rounds 210. According to an embodiment of the present invention, the PTM 120 at the sending node 102 repeats this pattern for the parameter during the test.

Figure 7:
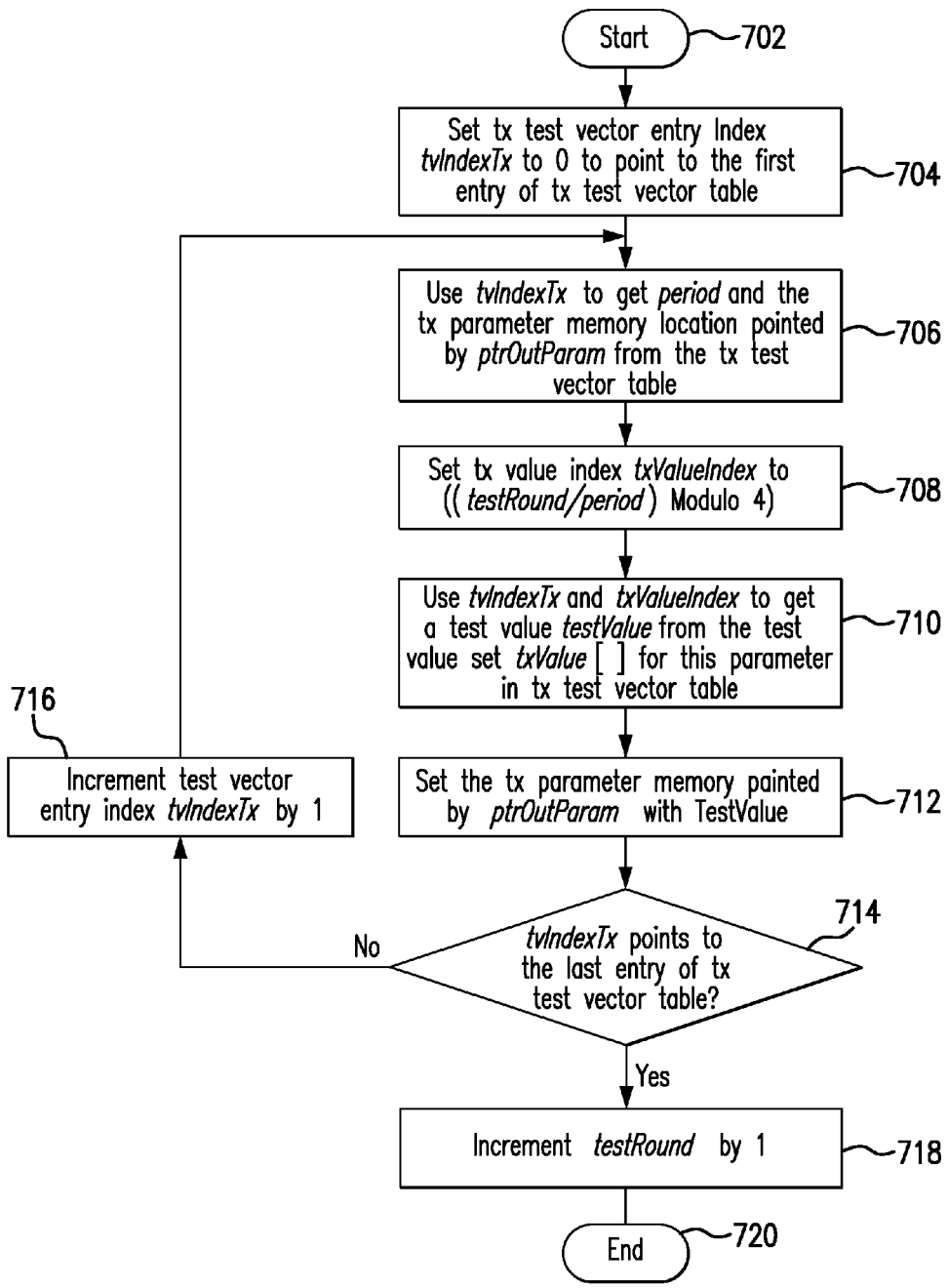
FIG. 7 is a flowchart illustrating an exemplary setting transmit parameters procedure, in accordance with an illustrated embodiment of the present invention.

FIG. 7 is a flowchart illustrating an exemplary setting transmit parameters procedure that may be utilized for testing distributed synchronous TTP communication networks, in accordance with an illustrated embodiment of the present invention. The procedure starts at 702. Then, the PTM 120 traverses the test vector data structure (i.e., test vector table) to set a test parameter with a pre-defined test value from rxValue[ ] for each entry in the test vector data structure.

More specifically, in one embodiment of the present invention, at step 704, the PTM 120 sets the test vector entry index to 0. At this point, the test vector entry index points to the first entry in the test vector table. Next, at step 706, the PTM 120 uses test vector entry index to get the period and memory location of test values array txValue[ ] associated with this entry in the test vector table.

According to an embodiment of the present invention, at step 708, the PTM 120 determines an index txValueIndex for accessing test values array txValue[ ] in the test vector on the sending node 102 for a currently evaluated parameter using the following formula (1):

$$txValueIndex = (testRound/period) \bmod n \quad (1)$$

where testRound is the test round counting field stored in the test command, period represents the parameter transmission period in units of TDMA round 210 and n is the size of the test values array txValue[ ]. Thus, if the PTM 120 employs the test values array of size 4, n=4, which is typical and used in the exemplary embodiment of the present invention.

At step 710, the PTM 120 gets a test value for the currently evaluated parameter from the test vector stored on the sending node 102. In one embodiment, the PTM 120 utilizes the test vector entry index and the index txValueIndex into the test values array to get a predefined input test value for the currently evaluated parameter from the test values array txValue[ ] in the test vector table. At step 712, the PTM 120 sets the memory location of the currently evaluated parameter with the test value determined in step 710. In the exemplary embodiment, such memory location is pointed to by the ptrOutParam pointer field of the test vector data structure.

At step 714, the PTM 120 determines whether the test vector entry index points to the last entry of the test vector. If the last entry of the test vector has been reached (decision block 714, "yes" branch), at step 718, the PTM 120 increments the test round counter, testRound, in the test command by one and the procedure ends at 720. In response to a determination that there are more entries in the test vector (decision block 714, "no" branch), the PTM 120 increments the test vector entry index by one (step 716) and returns to step 706 to continue traversal of the test vector table to set the rest of test parameters.

Figure 8B:
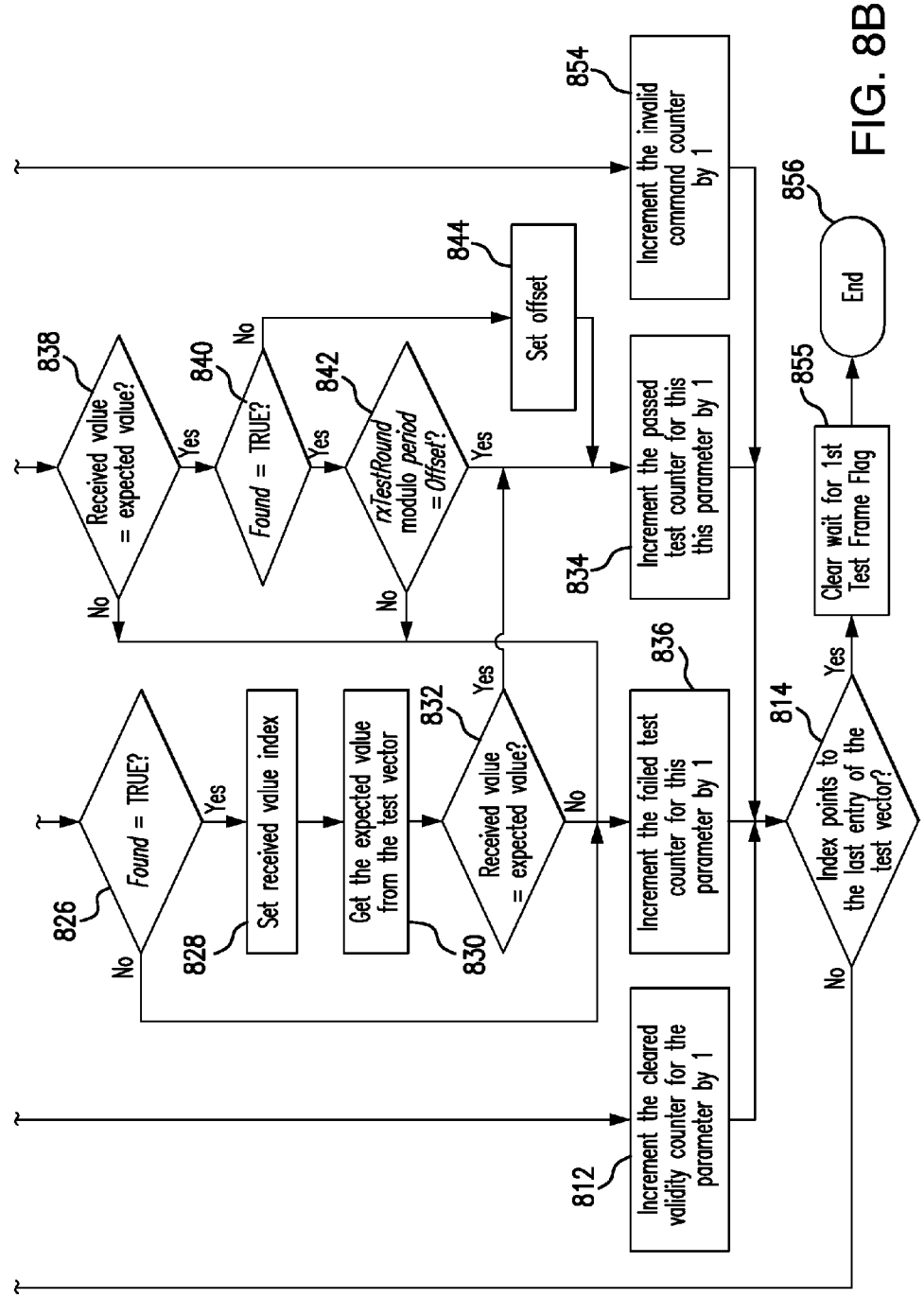

FIGS. 8A and 8B are a flowchart illustrating an exemplary received parameters verification procedure that may be utilized for testing distributed synchronous TTP communication networks, in accordance with an illustrated embodiment of the present invention. In one embodiment, this procedure comprises two stages. The first stage involves finding the parameter transmission round offset and performing offset consistency test. The second stage involves plugging in the found offset to perform the offset plug-in test. It should be noted that the steps described below are performed by the PTM 120 running on the receiving node 104.

The procedure starts at 802. At 804, the PTM 120 sets the test vector entry index to 0. At this point, the test vector entry index points to the first entry in the test vector table on the receiving node 104. Validity for a particular received parameter indicates status of integrity check of a latest received data frame that contains the particular parameter. Accordingly, at step 806, the PTM 120 gets the parameter validity from its memory location in the test vector stored on the receiving node 104. In one embodiment, the PTM 120 utilizes the test vector entry index to get the parameter validity from the memory location on the receiving node 104 pointed to by the ptrInParamValidity pointer of the test vector data structure.

According to an embodiment of the present invention, at step 808, the PTM 120 determines whether it is waiting for the first TTP frame 206. In response to determining that the newly received TTP frame 206 is a test frame received the very first time (decision block 808, yes branch), at step 810, the PTM 120 resets the parameter validity by setting "false" to the memory location pointed to by the ptrInParamValidity. This step prepares the PTM 120 for the offset search starting from the next test round. At step 812, the PTM 120 increments the cleared validity counter by one for the test parameter and checks whether the test vector entry index points to the last entry of the test vector (step 814). If the test vector index points to the last entry of the test vector table (decision block 814 "yes" branch), the PTM 120 sets the aforementioned flag to "false" (step 855) indicating that it is not waiting for the first test TTP frame 206 and ends the procedure at step 856. However, in response to determining that there are more entries in the test vector table (decision block 814, "no branch), the PTM 120 increments the test vector entry index at step 816 and continues traversal of the test vector table by returning to step 806 described above.

In response to determining that the received TTP frame 206 is not the test frame received the very first time (decision block 808, "no" block), at step 818, the PTM 120 evaluates the validities of the received test command. More specifically, the PTM 120 determines if the validities of both the rxTestFlag and the rxTestRound fields of the test command are set to "true" (step 818). In case the test command becomes invalid (i.e., a corrupted frame) during the frame transmission (i.e., if either or both of rxTestFlag and rxTestRound are invalid), the PTM 120 bypasses the current test round to avoid recording invalid test results. Accordingly, in response to determining that the test command is invalid (decision block 818, "no" branch), the PTM 120 resets the parameter validity to "false" to avoid finding incorrect offset (step 846), increments the invalid command counter by 1 for the test parameter (step 854) and returns to the step 814 described above.

According to an embodiment of the present invention, in response to determining that the received test command is valid (decision block 818, "yes" branch), at step 820, the PTM 120 determines whether the validity of the received parameter is "true". If the parameter validity is equal to boolean value "false" (decision block 820, "no" branch), the PTM 120 returns to the step 812. Otherwise (decision block 820, "yes" branch), at step 822, the PTM 120 gets the parameter value received in the TTP frame 206. In one embodiment, the step 822 involves using the test vector entry index to retrieve the period, offset, offset found field and the ptrInParam pointer from the test vector table. Furthermore, the step 822 involves getting the received parameter value from the memory location pointed to by the ptrInParam pointer field of the test vector table on the receiving node 104.

Various embodiments of the present invention rely on offset consistency properties, wherein the offset between the TDMA round a parameter's new test value is set and the TDMA round the parameter's test value is transmitted should be consistent for all periodic parameters given the way a parameter is set to a test value from txValue[ ] in the test vector and transmitted in the deterministic and jitter free host-to-host TTP synchronous network.

The PTM 120 starts offset search or the offset consistency test by first determining whether the received test round, rxTestRound, exceeds a predefined threshold, such as OFFSET_TEST_ONE_CNT. In one embodiment the predefined threshold may be equal to the longest parameter period or the number of TDMA rounds 210 in the TTP cluster cycle 212, whichever is bigger, multiplied by one thousand.

If the received test round counter, rxTestRound, does not exceed the threshold (decision block 824, "no" branch), the PTM 120 resets the parameter validity field to "false" at step 848 (clear the parameter validity after parameter value is obtained to get ready for offset consistency test of this parameter at the next test round). Next, at step 850, the PTM 120 sets the expected received value index rxValueIndex into array expRxValue[ ] using the following formula (2):

$$rxValueIndex = (rxTestRound/period) \bmod n \quad (2)$$

where n is the same as in Formula (1).

Next, at step 852, the PTM 120 gets the expected value from the test vector stored on the receiving node 104. In one embodiment, the PTM 120 uses the test vector entry index and the expected received value index rxValueIndex to retrieve the expected value from expRxValue[ ] in the test vector table. Once the expected value is retrieved, the PTM 120 compares the expected value with the received value at step 838. In case the received value does not match the expected value (decision block 838, "no" branch), at step 836, the failed test counter is incremented by 1. In response to determining that the expected value is equal to the received value (decision block 838, "yes" branch), the PTM 120 checks, at step 840, whether the offset found field value is equal to "true". If not (decision block 840, "no" branch), since the expected value matches the received value, the offset is found and the PTM 120 sets the offset at step 844. In one embodiment, in step 844, the PTM 120 utilizes the test vector entry index to set offset in offset data structure pointed to by the ptrTestTxRndOffset using the following formula (3):

$$offset = (rxTestRound \bmod period) \quad (3)$$

In addition, the PTM 120 sets the offset found field to "true". Next, at the step 834, the PTM 120 increments the test result pass counter. In response to determining that the offset found field is already set to "true" (decision block 840, "yes" branch), at step 842, the PTM 120 determines if the rxTestRound modulo period is equal to the saved offset. If so (decision block 842, "yes" branch), the offset consistency test passes at the current test round and the PTM 120 increments the test result pass counter (step 834). Otherwise (decision block 842, "no" branch), the offset consistency test fails at the current test round and the PTM 120 increments the failed test counter by one (step 836). It should be understood from formula (3) above that any transmission duration shorter than period would result in inconsistent offset.

Thus, an offset consistency test described above is utilized by the PTM 120 as a lower period filter to filter out all periodic and/or non-periodic parameters with actual transmission/update periods smaller than the expected/claimed. For instance, a period associated with a particular parameter may be claimed to be two TDMA rounds 210, while the actual transmission period for the parameter is one TDMA round 210. In this case the parameter would be actually transmitted every TDMA round. In this illustrative case, for test round two, offset at step 842 would be 0 (rxTestRound (2) modulo period (2)). However, for the next test round, test round 3, offset at step 842 becomes 1 (rxTestRound (3) modulo period (2)), which is inconsistent and would fail the offset consistency test.

Once the offset consistency test is complete, the PTM 120 performs the so called offset plug-in test described below. When the test round counter exceeds the threshold (decision block 824, "yes" branch), the PTM 120 checks if the offset found boolean field is set to "true". In response to determining that the offset was not found during the offset consistency test (decision block 826, "no" branch), the PTM 120 increments the failed test counter for this parameter by 1 (step 836) and returns to the step 814. On the other hand, in response to determining that the offset was found (decision block 826, "yes" branch), at step 828, the PTM 120 sets the expected received value index rxValueIndex into an array, for example expRxValue[ ], in the test vector on the receiving node 104 using the following formula (4):

$$rxValueIndex = ((rxTestRound - offset)/period) \bmod n \quad (4)$$

where n is the same as in Formula (1).

Next, at step 830, the PTM 120 gets the expected value from the test vector stored on the receiving node 104. In one embodiment, the PTM 120 uses the test vector entry index and the expected received value index rxValueIndex to retrieve the expected value from expRxValue[ ] in the test vector table. Once the expected value is retrieved, the PTM 120 compares the expected value with the received value at step 832. In case the received value does not match the expected value (decision block 832, "no" branch), at step 836, the offset plug-in test fails at this test round and the PTM 120 increments the failed test counter by 1 in step 836. If the received value matches the expected value, the plug-in test passes at this test round (decision block 832, "yes" branch); and the PTM 120 increments the test result pass counter at the step 834.

Notably, according to embodiments of the present invention, the PTM 120 does not invalidate the test parameters during the offset plug-in test, as it does in offset consistency test, unless the received test command is invalid, which should be a rare scenario. Thus, the expected values for a parameter form a continuous periodic data pattern and for every test round, the PTM 120 compares the received parameter value with a value from the expected value data pattern. Notably, the value with a received parameter stays unchanged until a new value is transmitted from the sending node 102 and received for this parameter on the receiving node 104; when a received frame containing a parameter passes integrity check, the parameter validity is set to "true", otherwise the parameter validity is set to "false". From formula (4) used by the PTM 120 at step 828, it can be seen that any adjacent transmission rounds of a parameter larger than the parameter's claimed period would make a received value stay longer than period TDMA rounds, which would result in a mismatch of the received and expected values for the parameter at least for some of the test rounds. Thus, effectively, the offset plug-in test acts as a higher period filter that can filter out all of the periodic and/or non-periodic parameters with actual transmission intervals bigger than they are claimed to be. For illustrative purposes only, assume that the expected value set is {0xff, 0x00, 0xa5, 0x5a}, the expected value pattern for a parameter with predefined/claimed period of one TDMA round 210, according to formula (4) should be {0xff, 0x00, 0xa5, 0x5a, 0xff, 0x00, 0xa5, 0x5a, . . . }. However, if the actual transmission period is equal to two TDMA rounds 210, the value pattern actually observed on the receiving node 104 would be either {0xff, 0xff, 0xa5, 0xa5, 0xff, 0xff, 0xa5, 0xa5,} or {0x00, 0x00, 0x5a, 0x5a, 0x00, 0x00, 0x5a, 0x5a, . . . }, depending on the parameter's actual transmission rounds relative to the test start round. Accordingly, the values mismatch would occur at least for some of the test rounds.

In various embodiments of the present invention, the PTM 120 running on the receiving node 104 maintains data structure that keeps track of test results. In one embodiment, the test result comprises an array with each entry dedicated to a parameter identified by the parameter ID, linking it to the parameters in each of the test vectors. An exemplary test results data structure is illustrated below, and may be used by the PTM 120 to keep track of test results:

```
typedef struct
{
    SS_U16 paramID;
    SS_U32 passCount;
    SS_U32 failCount;
    SS_U32 clearedValidtyCount;
    SS_U32 invalidRxTCCount;
} TTP_TEST_RESULT_STRUCT;
```

Here, the paramID is a unique number to identify a parameter and corresponds to identical field in the test vector tables stored by both the sending 102 and receiving 104 nodes and passCount, failCount and clearedValidityCount represent counters for passed tests, failed tests and cleared parameter validity, respectively, for each tested parameter. In addition, the test results data structure includes a counter for invalid received test commands invalidRxTCCount. All test result counting fields are initialized to 0 and the paramID field is set to the corresponding test parameter ID in the vector table by the PTM 120 on the receiving node 104.

Notably, in an exemplary embodiment, the test may be triggered by setting testFlag on sending node to "true" when the sending and receiving nodes are both up running and exchanging TTP frames.

The techniques described herein are exemplary, and should not be construed as implying any particular limitation of the certain illustrated embodiments. It should be understood that various alternatives, combinations and modifications could be devised by those skilled in the art. For example, steps associated with the processes described herein can be performed in other order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A system for testing distributed synchronous TTP communication networks, the system comprising:
    a first node coupled to a transmission bus, the first node configured and operable to:
        generate a test command comprising a test flag and a test round field;
        initiate a test by setting the test flag in the test command; and
        transmit the test command and a plurality of parameters to be tested via the transmission bus using data frames; and
    a second node coupled to the transmission bus, the second node configured and operable to:
        receive the test command and the plurality of the parameters to be tested from the transmission bus;
        determine whether the test flag in the received test command is set; and
        compare parameter values in the received data frames with corresponding expected values in a test vector stored on the second node, for each of the plurality of parameters, in response to determining that the test flag is set,
    wherein each entry in the test vector represents a test value employed for testing a specific parameter of the plurality of parameters transmitted from the first node to the second node and wherein the first node and the second node are configured to communicate with each other using a time triggered protocol on a time slot basis.

2. The system as recited in claim 1, wherein each of the plurality of parameters is associated with a predefined transmission period and wherein the second node is further configured to verify that each of the plurality of parameters is received at the predefined transmission period.

3. The system as recited in claim 2, wherein some of the plurality of parameters are associated with a multi-frame inter-transmission period.

4. The system as recited in claim 3, wherein the second node configured and operable to compare values is further configured and operable to perform parameter offset consistency test and to perform an offset plug-in test for each of the plurality of parameters, wherein the offset indicates the difference in time division multiple access (TDMA) round units from a test round in which the parameter is set with a new test value to a test round in which the parameter value gets transmitted, and wherein the offset is associated with each of the plurality of parameters.

5. The system as recited in claim 2, wherein the second node is further configured and operable to display test results based on the comparison of the received values with the expected values for each of the plurality of parameters and based on the performed verification that each of the plurality of parameters is received at the predefined transmission period.

6. The system as recited in claim 1, wherein the first node hosts a plurality of applications configured and operable to generate the plurality of parameters.

7. The system as recited in claim 1, wherein the second node hosts a plurality of applications configured and operable to utilize the plurality of parameters.

8. The system as recited in claim 1, wherein the test round field is incremented after transmission of each data frame when the test has been initiated.

9. The system as recited in claim 1, wherein the first node comprises a first communication controller and the second node comprises a second communication controller and wherein the first communication controller is configured and operable to generate and populate the data frames of parameters to be tested and wherein the second communication controller is configured and operable to determine integrity of the data frames of parameters received from the transmission bus.

10. The system as recited in claim 1, wherein each of the plurality of parameters is associated with validity information, wherein the validity information for a particular parameter indicates status of integrity check of a latest received data frame that contains the particular parameter.

11. A method for testing distributed synchronous TTP communication networks, the method comprising:
generating, by a first node, a test command comprising a test flag and a test round field;
initiating, by the first node, a test by setting the test flag in the test command;
transmitting, by the first node, the test command and a plurality of parameters to be tested via a transmission bus using data frames;
receiving, by a second node, the test command and the plurality of the parameters to be tested from the transmission bus;
determining, by the second node, whether the test flag in the received test command is set; and
comparing, by the second node, parameter values in the received data frames with corresponding expected values in a test vector stored on the second node, for each of the plurality of parameters, in response to determining that the test flag is set, wherein each entry in the test vector represents a test value employed for testing a specific parameter of the plurality of parameters transmitted from the first node to the second node.

12. The method as recited in claim 11, wherein each of the plurality of parameters is associated with a predefined transmission period.

13. The method as recited in claim 12, the method further comprising verifying, by the second node, that each of the plurality of parameters is received at the predefined transmission period.

14. The method as recited in claim 12, wherein at least some of the plurality of parameters are associated with a multi-frame inter-transmission period.

15. The method as recited in claim 14, the method further comprising performing, by the second node, parameter transmission offset consistency test and performing an offset plug-in test for each of the plurality of parameters, wherein the offset indicates the difference in time division multiple access (TDMA) round units from a test round in which the parameter value is set with a new test value to a test round in which the parameter value gets transmitted, and wherein the offset is associated with each of the plurality of parameters.

16. The method as recited in claim 13, the method further comprising displaying, by the second node, test results based on the comparison of the received values with the expected values for each of the plurality of parameters and based on the performed verification that each of the plurality of parameters is received at the predefined transmission period.

17. The method as recited in claim 11, wherein the first node hosts a plurality of applications configured and operable to generate the plurality of parameters and wherein the second node hosts a plurality of applications configured and operable to utilize the plurality of parameters.

18. The method as recited in claim 11, wherein the test round field is incremented after transmission of each data frame when the test has been initiated.

19. A computer program product for testing distributed synchronous communication networks, the computer program product comprising:
one or more computer-readable storage devices and a plurality of program instructions stored on at least one of the one or more computer-readable storage devices, the plurality of program instructions comprising:
program instruction to generate, by a first node, a test command comprising a test flag and a test round field;
program instructions to initiate, by the first node, a test by setting the test flag in the test command;
program instructions to transmit, by the first node, the test command and a plurality of parameters to be tested via a transmission bus using data frames;
program instructions to receive, by a second node, the test command and the plurality of the parameters to be tested from the transmission bus;
program instructions to determine, by the second node, whether the test flag in the received test command is set; and
program instructions to compare, by the second node, parameter values in the received data frames with corresponding expected values in a test vector stored on the second node, for each of the plurality of parameters, in response to determining that the test flag is set, wherein each entry in the test vector represents a test value employed for testing a specific parameter of the plurality of parameters transmitted from the first node to the second node.

20. The computer program product as recited in claim 19, the program instructions further comprising program instructions to verify, by the second node, that each of the plurality of parameters is received at a predefined transmission period.

* * * * *